Feb. 13, 1968    K. E. LOVE ETAL    3,368,568
METHOD AND APPARATUS FOR ORIENTING, ALIGNING
AND CONVEYING TOBACCO LEAVES
Filed April 27, 1966
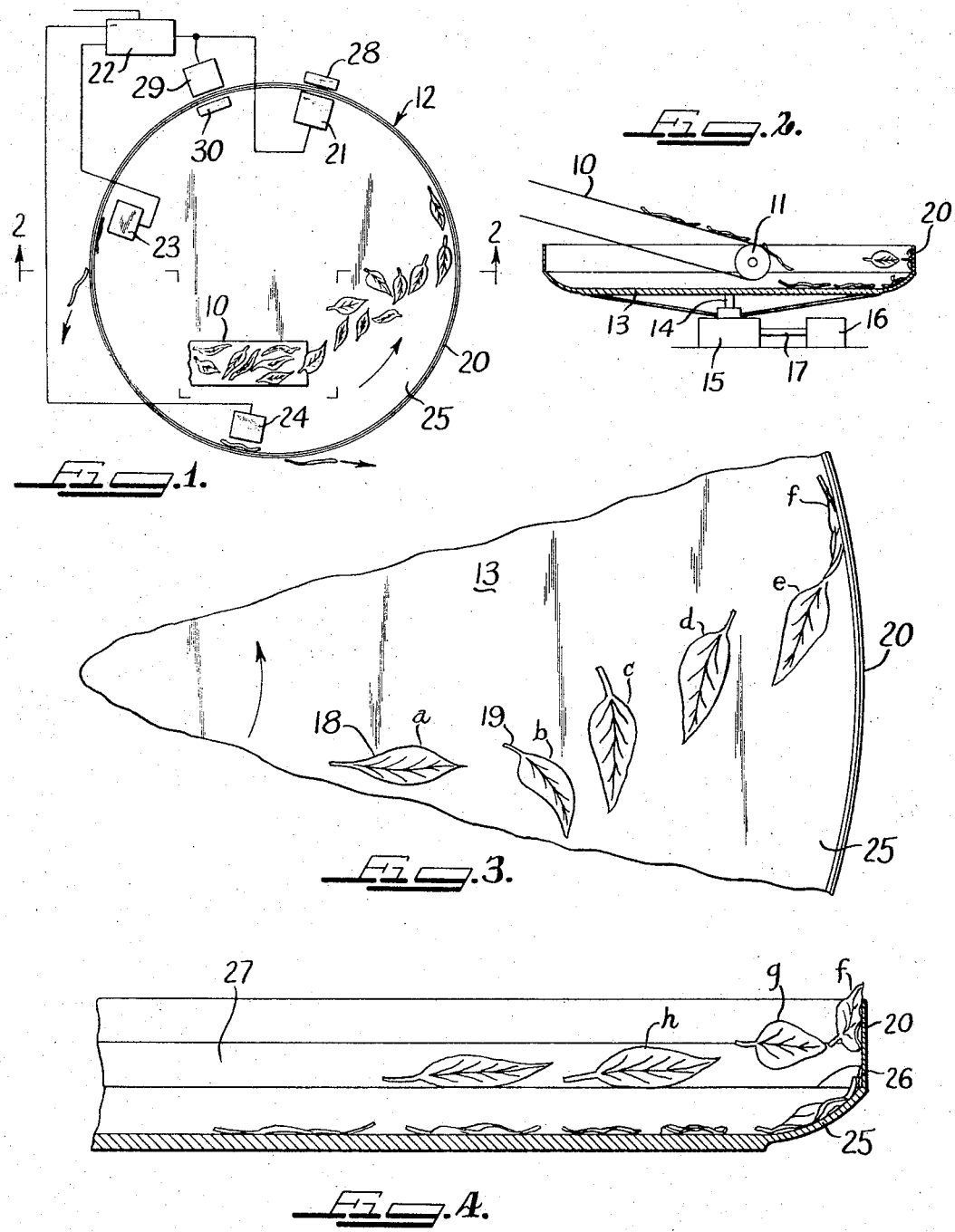
INVENTORS
KENNETH E. LOVE
CHARLES L. MOULTON
BY
Horton, Davis, Brewer & Brugman
Attys.

United States Patent Office 3,368,568
Patented Feb. 13, 1968

3,368,568
METHOD AND APPARATUS FOR ORIENTING, ALIGNING AND CONVEYING TOBACCO LEAVES
Kenneth E. Love, Oak Ridge, and Charles L. Moulton, Knoxville, Tenn., assignors to True-Grade, Inc., Oak Ridge, Tenn., a corporation of Tennessee
Filed Apr. 27, 1966, Ser. No. 545,650
15 Claims. (Cl. 131—149)

This invention relates to method and apparatus for orienting, aligning and conveying tobacco leaves or like material for subsequent sorting and processing. For illustrative purposes, this invention will be described as it may be applied to orienting, aligning and grading tobacco leaves.

In the tobacco industry, it is necessary to grade tobacco leaves according to various standards, such as color, size, type, etc. This grading is presently done by individuals who stand before moving conveyor belts on which the leaves are carried from a central loading point. The unwanted leaves, when observed by the individual, are manually removed from the conveyor. Due to the large quantity of leaves that must be graded in a given season, the leaves may be several layers thick on the conveyor as they pass the individual to complete the grading operation within the time available, thereby resulting in many unwanted leaves being covered by satisfactory leaves and passing by unobserved. The normal efficiency of an individual is presently approximately 35%, which means that 65% of the unwanted leaves are allowed to remain in the subsequently processed tobacco leaves. This situation is further aggravated by the lack of trained grading personnel.

In a co-pending application of Frank Fuis, Jr., Charles L. Moulton, and Carl J. Green for Improvements to Tobacco Strippers and/or Graders, filed Oct. 5, 1965, S.N. 493,043, there is disclosed a grading apparatus for leaf and sheet material which effects an automatic ejection of unwanted leaves by the use of photo-electric sensing means dictating to leaf ejecting apparatus through an electronic signal-differentiating device. For greatest efficiency of the disclosed grading apparatus it is necessary to present the leaves to the photo-electric sensing means in a predetermined orientation and location relative to the sensing means.

It is also desirable in other phases of the processing of tobacco leaves to orient the leaves with respect to apparatus which is intended to strip the leaf tissue from the stem of the leaf. Thus if the leaf is presented to such apparatus stem foremost, the stem can be drawn through the apparatus and the tissue stripped therefrom. If, however, the stem is disposed cross-wise of the stripping apparatus, it is inevitable that the stripping mechanism will move transversely through the leaf and the stem will be severed into fragments which are then practically impossible to remove from the stripped and shredded tobacco. The stem constitutes an undesirable foreign element in the processed tobacco.

The principal object of this invention is to provide improved apparatus and method for orienting and locating leaves or like material on a moving carrier so that said leaves or like material can be readily and automatically observed, graded, or otherwise processed.

A more specific object of this invention is the provision of a leaf orienting and locating apparatus which makes use of the differential centrifugal force developed in a leaf as between its heavier stem and lighter tissue to orient the leaf in a predetermined direction and then utilizes centrifugal force on the oriented leaf as a whole to hold the leaf in a precisely located vertical plane as it passes by a grading station where photo-electric sensing means differentiates the passing leaves according to the presence or absence of a given quality.

A further specific object is to provide apparatus which will cause tobacco leaves to assume a predetermined position in a precisely located vertical plane so that the leaves will all pass by a photoelectric sensing means for automatic grading of the leaves.

These and other objects of this invention will become apparent from the following detailed description of a preferred embodiment thereof when taken together with the accompanying drawings in which;

FIG. 1 is a plan view of a leaf orienting and locating apparatus incorporating this invention;

FIG. 2 is a side elevational view in section of the apparatus of FIG. 1 taken along line 2—2 of FIG. 1;

FIG. 3 is a fragmentary view on an enlarged scale of the apparatus of FIG. 1 showing the typical movement of a leaf in said apparatus; and FIG. 4 is a side elevational view of the fragment of apparatus of FIG. 3.

Tobacco leaves are stripped from the stalk when they have acquired a predetermined amount of moisture or "case" after drying in a barn. This case is preserved in the leaf during grading so that at the time the leaves are to be graded or subsequently processed they possess a certain pliability. The dried leaf, before it is cased, is in a folded or wrinkled condition about its stem, but when it is cased, it opens itself to some extent and can easily be completely opened by mechanical manipulation without disintegrating. The method and apparatus of this invention are facilitated by using as starting material tobacco leaves which have acquired a "case."

In its preferred procedure, this invention consists in placing tobacco leaves on a rotating table by which the leaves are given a rotary motion to generate a centrifugal force within them. In its preferred form, the table is rotated about a vertical axis, and the leaves are dropped upon an upper surface of the table at a location removed from the center of the table. The leaves may be carried to the table on a belt-type feed conveyor and given an initial movement on the table which is at right angles to a radius of the table. The leaves may be loaded on the feed conveyor from a central bin, and when on the conveyor the leaves do not have any predetermined orientation. The laves may additionally be placed on the conveyor in such quantities that they are several layers thick. The conveyor may be relatively wide so that more than one leaf at a time will occupy a given radius on the table.

In a typical arrangement, the table is twelve feet in diameter and is rotated at approximately 60 r.p.m. The tobacco leaves dropped thereon are subjected to the force of friction developed between the individual leaf and the table surface, which if sufficiently great, tends to impart a rotary motion to the leaf. The air adjacent the leaf and located above the table does not rotate as rapidly as the table, and the movement of the air decreases rapidly with the distance of the air from the rotating table surface. The motion of a leaf on the table is therefore resisted by the air superposed upon it, and this resistance is relied upon, together with the differential force of friction as between the lighter leaf tissue and the heavier stem, to turn the leaf so that its stem faces "into the wind," i.e., in a circumferential direction relative to the table.

The centrifugal force developed in the leaf by its movement on the table causes the leaf to move outwardly of the table to strike a vertical wall or flange moving with the table. If the leaf is already oriented with its stem pointing in the direction of movement, the leaf will simply flatten itself against the wall, but if the leaf is not yet so oriented, it will contact the wall initially with either the stem or the tip. The contacting end will immediately move with the wall and the remainder of the leaf, like a streamer in the wind, will be pulled behind the moving end, thus completing the orienting process.

The force of friction developed between the wall and leaf by the centrifugal force is preferably less than the force of gravity acting on the leaf, so that the leaf, though initially thrown against the wall by centrifugal force, will tend to slide down by gravity. A ledge or change in contour is provided between the wall and table surface to which the leaf may fall and by which the leaf will be supported during its movement with the table past a grading station. The ledge provides a reference point which is utilized to locate the leaf at a predetermined position relative to the sensing device at the grading station which is to detect undesirable characteristics in a leaf and dictate to a leaf ejecting mechanism at an adjacent station.

It is expected that in view of the large number of leaves to be graded, that it would be impractical to place the leaves on the table one at a time, and hence the grading is preferably done in two stages. In the first, two or more leaves are permitted to be superimposed upon one another at the wall, and only the leaf exposed to the sensing device will be "read" by the sensing device. The undesirable leaf and those covered by it will be ejected together and transferred to a second grader which is substantially identical to the first, except that it will have fewer leaves to grade and hence will be more likely to have a single layer of leaves pass its sensing station.

Thus in the two-stage method, if one hundred leaves are to be graded and they pass the sensing station five deep, i.e., in layers of five leaves, the first stage "reads" twenty leaves instead of one hundred, and the second stage reads five leaves instead of twenty, making a total of twenty-five "readings" instead of one hundred, as would be the case if the leaves were to be sensed or "read" individually in the first instance. Furthermore, the two stages, although consecutively arranged in the process, may be simultaneously carried out, thereby in effect grading one hundred leaves in the time it takes to grade twenty leaves.

In the two-stage method, the first stage may provide just two sorts, the desirable leaf and the undesirable, and in the second stage, the undesirable leaves may be divided into several sorts, inasmuch as fewer leaves will be involved in the second stage and the sorting may proceed at a slower pace.

It will be appreciated that if an undesirable leaf should be covered by one or more leaves at the wall, the undesirable leaf will not be detected by the sensing device and hence it will pass out of the grader with the desirable leaves. If the percentage of undesirable leaves in the end product is found to be too high, the input to the grader can be reduced so that fewer layers of leaves will be formed, thereby increasing the possibility of detecting the undesirable leaves. Alternatively, by using a transparent wall, the leaves on one side may be read first, and those which pass the first sensing device as satisfactory may then be read through the transparent wall to eliminate those concealed from the first sensing device, but visible to the second sensing device through the transparent wall. Adverting to the illustrative example previously given, if one hundred leaves are to be graded, and they pass the sensing station in layers of five leaves, by using a transparent wall forty leaves will be read in the same time that twenty are read using an opaque wall. The transparent wall may also be used in the second stage if the number of leaves increases to the point where they too are occasionally sensed in layers.

Referring now to the drawings for a more detailed description of the illustrative embodiment of the invention shown therein, the tobacco leaves which have been cased and are ready to be sorted are shown as they arrive from a central storage location (not shown) on a conveyor 10. Said conveyor may be of the belt type and passes over a roller 11 located over the leaf orienting and transporting device designated generally by the reference character 12.

The quantity of leaves carried by the conveyor per unit time may be regulated either by changing the speed of the conveyor or by reducing the load on the conveyor, both of which may be accomplished by well known means which are not shown in the drawings.

The orienting and transporting device 12 is comprised of a turntable 13 which is appropriately mounted on a vertically disposed drive shaft 14 located below the turntable and rotatably mounted on and driven by a speed-reduction mechanism 15 of any appropriate known type. The speed-reduction mechanism is in turn driven by a motor 16 through a shaft 17. Said motor 16 may be an electric motor equipped with the usual start-stop control (not shown) through which it is connected to a source of electrical energy. In one illustrative embodiment, the motor drive shaft 17 rotated at 1750 r.p.m., and the speed reducer 15 had a ratio of 1750 to 60 so that the speed of turntable shaft 14 and turntable 13 was 60 r.p.m. The diameter of turntable 13 was 12 feet and the linear velocity of the periphery of the turntable was accordingly 37.68 feet per second. It may be appreciated that at this velocity an appreciable centrifugal force will be developed in leaves dropped upon the turntable.

A typical path taken by a leaf dropped on turntable 13 by conveyor 10 is illustrated in FIGS. 3 and 4. Assuming a rather unfavorable position of a leaf for the subsequent orienting process, a leaf 18 is shown in an initial position *a* immediately adjacent the exit end of conveyor 10 from which it had been dropped on rotating turntable 13. The leaf rests by its own relatively light weight upon the surface of turntable 13 and hence there may be some initial slippage of the leaf on the turntable. As the leaf is carried around by the table in a curvilinear path it will be moved radially outwardly to the position *b* by centrifugal force. The stem 19 of the leaf is somewhat heavier than the remainder of the leaf and may be curved so that it contacts the surface of the table. This contact creates a point of concentrated weight on the leaf which increases the friction and decreases the slippage thereat which in turn causes a turning of the leaf so that the stem turns in the direction of rotation of the surface of turntable 13 to begin the orientation of the leaf in this direction. The upper surface of turntable 13 is exposed to the relatively stationary air above it into which the curled leaf extends. The relatively stationary air will have its greatest effect upon the tissue of the leaf and relatively little effect upon the thin stem and hence the air will tend to retard the movement of the tissue while the heavier stem in contact with the turntable will tend to move with the turntable and then radially outwardly because of the centrifugal force developed in the accelerating leaf. A torque is thus developed in the leaf tending to turn it so that its stem faces out toward the periphery of the table as shown in the successive stages *c*, *d*, and *e*.

The medium on which the leaves are to be scanned for defects is a relatively narrow flange 20 which extends vertically from the surface of turntable 13 and is rotatable with said table. Flange 20 may be an independent structure located at the rim of turntable 13 and having its own drive mechanism, or for convenience, it may be secured to or formed integrally with said turntable as shown in FIGS. 2 and 4. It is desired that the leaves will be moved against flange 20 by centrifugal force and then carried by said flange past a photoelectric scanning or reading station shown diagrammatically at 21, which is appropriately connected to a signal interpreting device 22 which then dictates to one or more leaf-ejecting devices 23 angularly displaced relative to the scanning device 21. Those leaves which pass the ejecting devices 23 are then ejected by a final ejecting device 24 to empty the turntable.

For efficient scanning, i.e., to present the maximum surface of the leaf to the scanning device, it is desirable that the leaf be turned from the horizontal position it assumes on the turntable to a vertical position in which it will pass the scanning device. There is no assurance, however, that the leaf will turn unassisted in making the transition from table 13 to flange 20, and accordingly, a fillet 25 is formed in the corner between the upper surface of table 13 and flange 20. A leaf moving radially outwardly therefore encounters fillet 25 and is turned by said fillet sufficiently so that when it contacts flange 20, it will lie substantially flat against said flange.

It has been found that the velocity of the leaves as they move outward will be different as between leaves so that some will rise higher on the flange than others. For efficient scanning, however, it is desired that all leaves be located at substantially the same level on the flange. To this end, the angular velocity of the turntable is so chosen that the leaves will not develop sufficient frictional force relative to the flange surface to hold them against the said flange surface at any particular level, but will fall, although still in a vertical position because of centrifugal force. Instead of a constant curvature of fillet 25, therefore, a sharp break 26 is made between fillet 25 and flange 20 which provides a stop for the leaf as it falls or slides down the surface of flange 20, and hence the leaves will all lie substantially in a single band, the lower edge of which is represented by break 26. Said break 26 may be a small ledge which does not interfere with the normal movement of the leaf from the fillet to the flange, but which will stop the fall of the leaf.

Thus, as shown in FIG. 4, the leaf may assume the position $f$ which represents the highest point of the leaf on flange 20, and then will fall as shown in the positions $g$ and $h$ where its lower edge rests upon ledge 26 and remains there during the "reading" or scanning cycle.

In the illustrative embodiment of the invention shown in the drawings, flange 20 is made of an opaque substantially black material which may be metal, wood or fibre glass painted black. A band 27 of light pigment, such as white, aluminum or the like, is applied to the interior of flange 20, either as a paint, or as a flexible similarly pigmented strip adhered to the flange. Said band 27 provides a contrasting background for the leaves and a reference color against which to measure or compare the color of the leaves. Alternatively, flange 20 may be made of transparent plastic with a fixed background 28 of the desired color disposed directly opposite the scanning station 21 outside of flange 20. A second scanning station 29 angularly removed from station 21 may be disposed on the outside of transparent flange 20 and a fixed background 30 disposed directly opposite scanning station 29 on the inside of flange 20, the second scanning station serving to eliminate leaves hidden from scanning station 21, but visible through a transparent flange.

As stated previously, a second turntable (not shown) equipped with one or more scanning devices and similar to turntable 12 in all respects, except size, may be used to re-grade those leaves ejected from turntable 12.

It is contemplated that scanning devices 21, 29, and signal interpreting device 22 will be of the type disclosed in the aforesaid copending application of Frank Fuis, Jr., et al. The ejecting device will be solenoid-operated as is also the one disclosed in the said Frank Fuis, Jr., et al. application. Instead of scanning devices, the oriented leaves may be conveyed by turntable 12 to leaf processing apparatus (not shown) located at an appropriate position adjacent the turntable. Thus the method and apparatus of this invention may be used by the tobacco grower to grade leaves, or it may be used by a processor to re-grade and process leaves. Other uses for the method and apparatus of this invention will suggest themselves to those skilled in the art.

In addition to the functions of orienting and conveying leaves or the like, the method and apparatus of this invention has been found to perform a cleaning function upon the products graded in that the centrifugal force developed by the table 13 will tend to separate sand and heavier dirt from the products. The lighter dirt, such as dust, feathers, dried grass and bits of leaves, may be blown out, if an air-jet type of ejecting mechanism is used to remove the leaves at the ejecting stations 23 and 24.

It is understood that the foregoing description is merely illustrative of a preferred embodiment of the invention and that the scope of the invention therefore is not to be limited thereto, but is to be determined by the appended claims.

We claim:

1. The method of aligning and orienting tobacco leaves or the like which comprises depositing unaligned and un-oriented leaves in a stream upon a carrier at a station spaced from the edge thereof, rotating said carrier to impart centrifugal force to said leaves through frictional contact therewith, said leaves comprising a relatively heavy central tapered stem and relatively light tissue extending laterally from said stem, the center of gravity of said leaf being located toward the thicker part of the stem, said centrifugal force in said relatively heavy stem being greater than in said tissue portion and causing said leaf to move radially outwardly stem first to orient said leaf with respect to said carrier, and intercepting said radially moving leaf by a circumferentially moving wall, against which said leaf is pressed by centrifugal force, said leaf contacting the circumferentially moving wall stem first to cause said leaf to be pulled stem first by said wall and thereby to orient itself against said wall with the stem of the leaf aligned with the direction of movement of the wall.

2. The method described in claim 1, and the further step of turning said leaf from the plane of the carrier to the plane of said intercepting wall.

3. The method described in claim 1, and the further step of displacing said leaf axially of the plane of the rotating carrier while simultaneously turning said leaf from the plane of the carrier to the plane of said intercepting wall.

4. The method described in claim 1, and the further step of retarding the leaf relative to the rotating carrier prior to its contact with the wall such that its angular velocity is less than the angular velocity of the rotating carrier.

5. The method described in claim 1, and the further step of rotating said carrier in relatively stationary air which contacts the leaf and retards its rotational movement while on the carrier and before it contacts the wall such that the angular velocity of the leaf is less than the angular velocity of the rotating carrier.

6. The method described in claim 1, and the further step of holding said leaf on said carrier by the weight of the leaf.

7. The method described in claim 1, said centrifugal force being sufficient to hold the leaf against said circumferentially moving wall but not sufficient to cause the force of friction developed between the leaf and wall to equal the weight of said leaf, and the further step of supporting said leaf vertically while said leaf is held against said wall by centrifugal force.

8. Apparatus for orienting and aligning leaves having a relatively heavy stem and relatively light tissue extending laterally from said stem, said apparatus comprising a rotatable carrier for the leaves, said carrier creating differential centrifugal force in said stem and tissue to move said leaf radially outwardly with respect to said carrier while turning said leaf to direct the heavier stem radially outwardly, and a rotating curvilinear wall disposed angularly with respect to said carrier and in the path of movement of said turned leaf and adapted to contact said stem of the leaf first to pull said leaf stem first off said carrier and align said stem of the leaf with the direction of movement of said wall.

9. Apparatus as described in claim 8, said carrier comprising a substantially flat surface.

10. Apparatus as described in claim 8, said carrier comprising a substantially horizontally disposed surface.

11. Apparatus as described in claim 8, said curvilinear wall comprising a vertically disposed rim connected to and rotatable with said carrier.

12. Apparatus as described in claim 8, said carrier comprising a turntable having a substantially flat horizontally disposed leaf-supporting surface thereon, said wall comprising a vertically disposed rim secured to and rotatable with said carrier, and means intermediate the carrier and rim for turning said leaves from the horizontal plane of the turntable to the vertical plane of the rim.

13. Apparatus as described in claim 8, said carrier comprising a turntable having a substantially flat horizontally disposed leaf-supporting surface thereon, said wall comprising a vertically disposed rim secured to and rotatable with the turntable, and a sloping surface connecting the turntable surface to the vertically disposed rim to turn said leaves from the plane of the turntable to the plane of the wall.

14. Apparatus as described in claim 13, said sloping surface having a relatively abrupt change of curvature adjacent said rim to provide a ledge upon which the leaf may be vertically supported, said ledge providing a reference surface against which said leaves are aligned in moving with said rim.

15. Apparatus according to claim 8, said curvilinear wall being transparent, and scanning means on either side of the transparent wall for scanning two or more layers of leaves in one cycle.

References Cited

UNITED STATES PATENTS

| | | | |
|---|---|---|---|
| 2,367,911 | 1/1945 | Wells | 131—20 |
| 2,574,030 | 11/1951 | Green | 131—131 |
| 2,690,856 | 10/1954 | Trondle | 221—183 |
| 2,693,808 | 11/1954 | Kochalski et al. | 131—96 |
| 2,930,352 | 3/1960 | Kasten | 119—52 |
| 2,973,548 | 3/1961 | Walker | 198—209 X |
| 3,061,067 | 10/1962 | Liberty et al. | 198—30 |
| 3,243,935 | 4/1966 | Kampa et al. | 198—30 X |

ALDRICH F. MEDBERY, *Primary Examiner.*